United States Patent [19]

Perkins et al.

[11] Patent Number: 4,724,532
[45] Date of Patent: Feb. 9, 1988

[54] VIBRATOR RESPONSE LINEARIZATION CIRCUIT

[75] Inventors: Dean P. Perkins, Pasadena; Allan H. Mueller, Houston, both of Tex.

[73] Assignee: Geosource, Inc., Houston, Tex.

[21] Appl. No.: 762,206

[22] Filed: Aug. 5, 1985

[51] Int. Cl.⁴ .............................................. G01V 1/155
[52] U.S. Cl. ...................... 367/189; 73/664
[58] Field of Search .............. 367/137, 143, 189; 181/113, 114, 119, 121; 318/114; 328/22, 28; 307/261; 73/664

[56] References Cited

U.S. PATENT DOCUMENTS

| | | | |
|---|---|---|---|
| 3,234,504 | 2/1966 | Wischmeyer | 367/189 |
| 3,460,648 | 8/1969 | Brown et al. | 367/189 |
| 3,502,911 | 3/1970 | Lehman | 328/28 |
| 3,815,704 | 6/1974 | Eisner | 340/15.5 |
| 4,516,230 | 5/1985 | Goodloe et al. | 367/190 |
| 4,616,352 | 10/1986 | Sallas et al. | 367/190 |

OTHER PUBLICATIONS

Paper entitled: "Vibrator Output Power Experiment", by W. E. Lerwill, dated May 4, 1982 at Industrial Vehicles International, Inc., Tulsa, Okla.

"The Amplitude and Phase Response of a Seismic Vibrator", by W. E. Lerwill, presented at the 1982 Meeting of the European Association of Exploration Geophysicists in Istanbul.

"Seismic Sources on Land", by W. E. Lerwill.

Primary Examiner—Deborah L. Kyle
Assistant Examiner—Ted L. Parr
Attorney, Agent, or Firm—Arnold, White & Durkee

[57] ABSTRACT

A method and apparatus for driving a seismic hydraulic vibrator in which a conventional sinusoidal drive signal in modified in such a manner as to improve vibrator response parameters. The sinusoidal drive signal is modified such that in the regions of the signal proximate the reference axis, the signal will abruptly pass from one side of the reference axis to the other side of the reference axis. This modification is accomplished by summing a square wave signal with the sinusoidal signal to form a composite drive signal.

12 Claims, 11 Drawing Figures

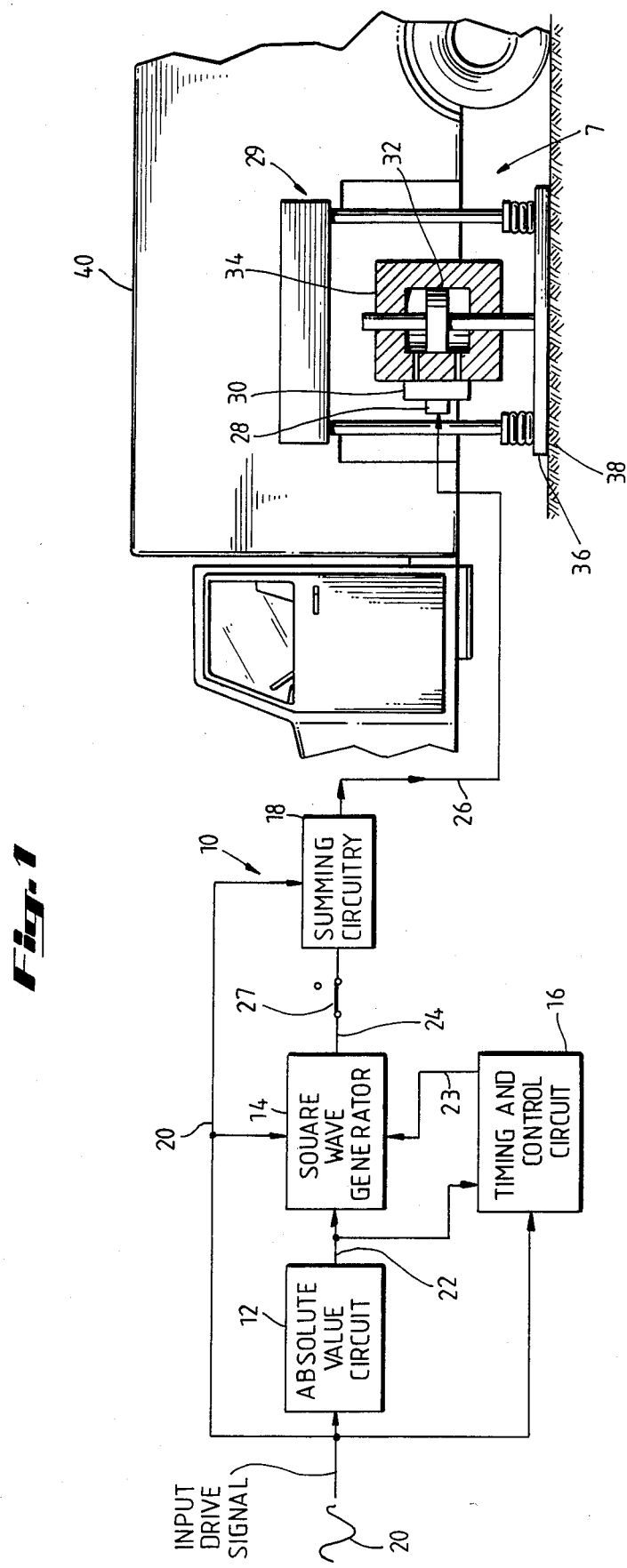

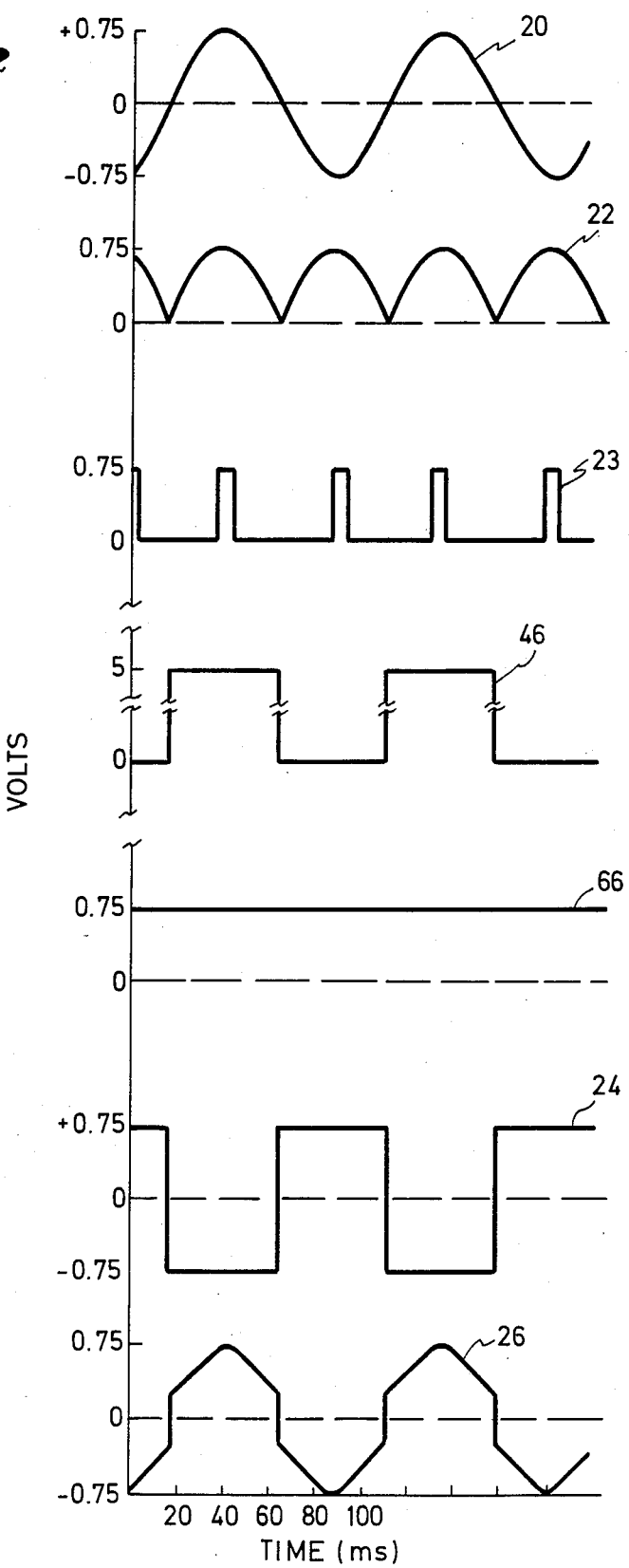

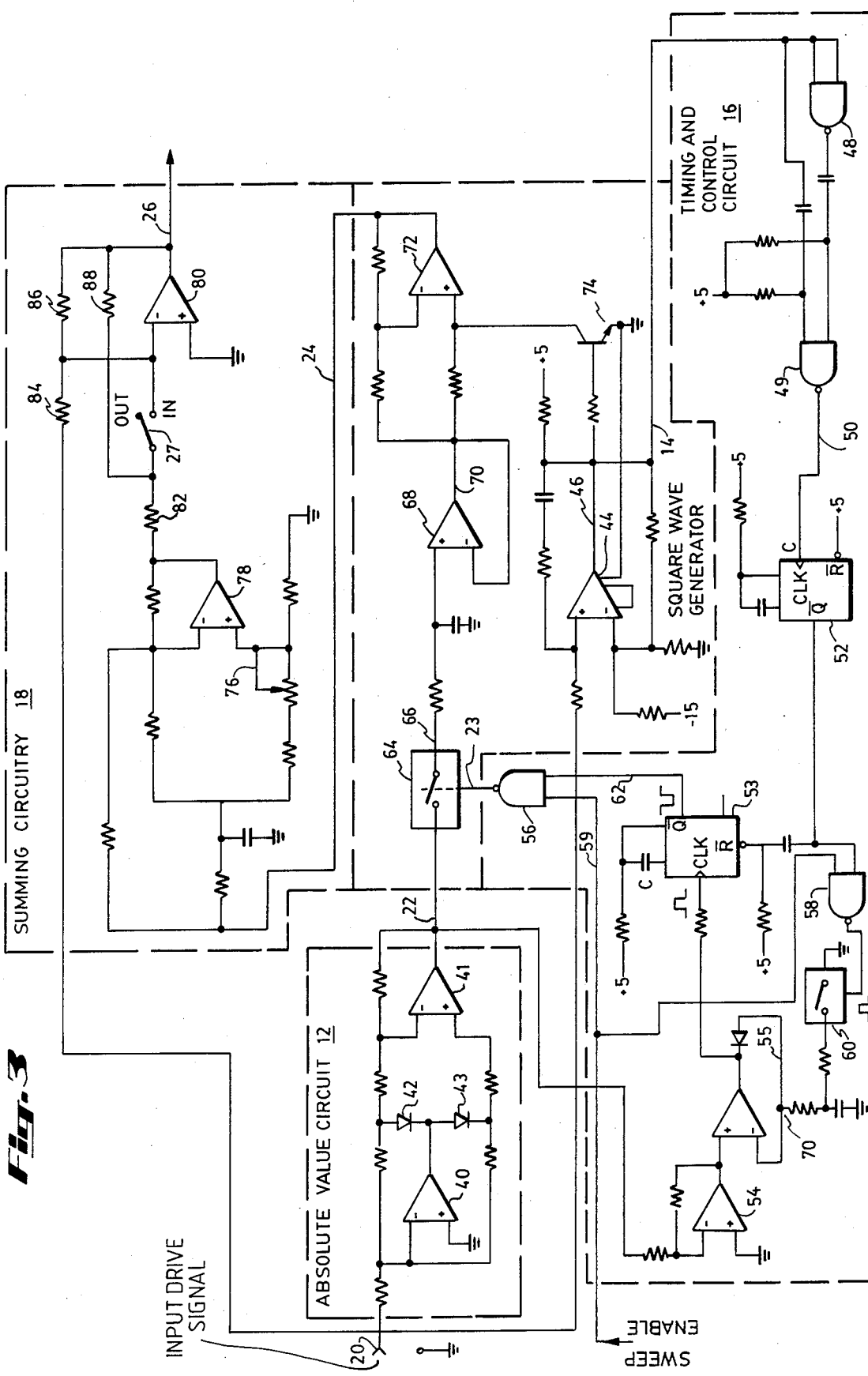

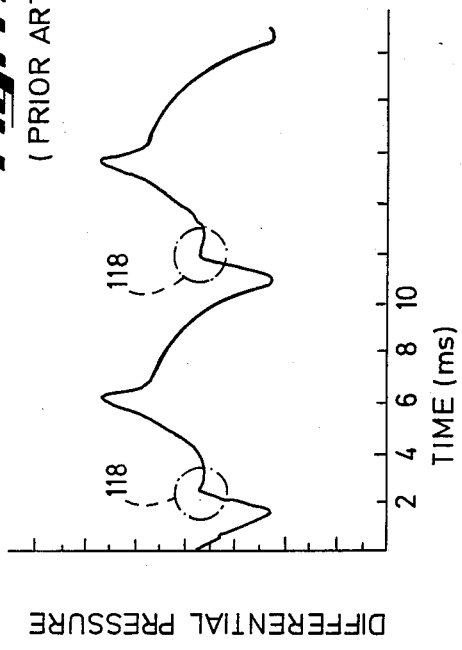
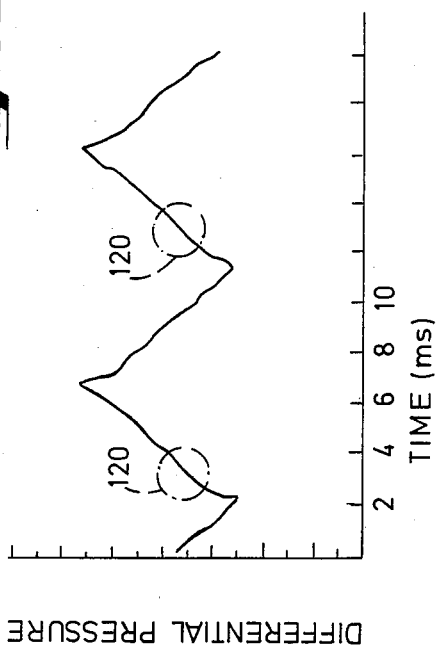
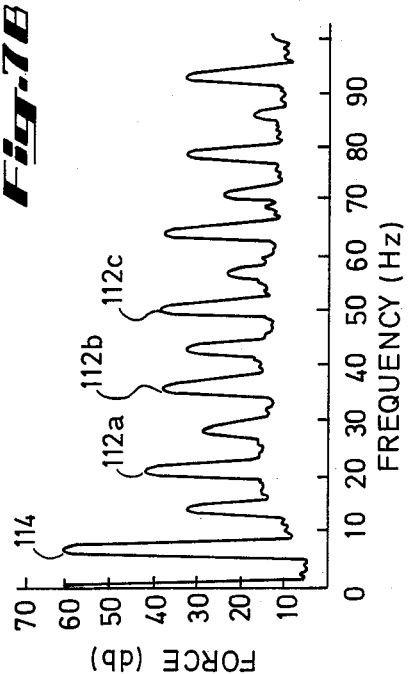
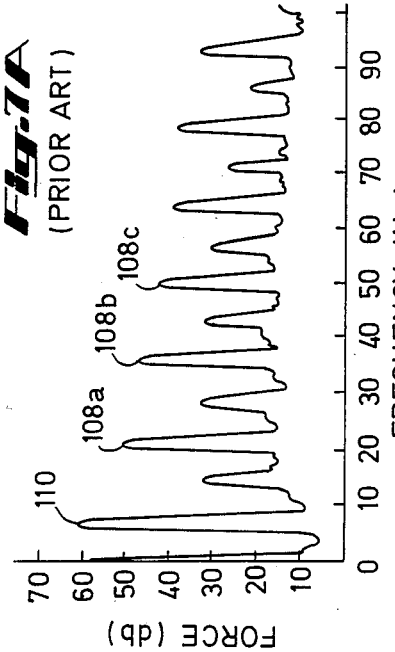

VIBRATOR RESPONSE LINEARIZATION CIRCUIT

BACKGROUND OF THE INVENTION

The present invention relates generally to a method and apparatus for controlling a hydraulically powered seismic vibrator, and more particularly relates to a method and apparatus for controlling the pressure of the hydraulic fluid driving the vibrator so as to improve the quality of the signal imparted to the earth by the vibrator.

Hydraulically powered vibrators are commonly used in seismic exploration to impart energy into the earth. A typical vibrator comprises a piston and cylinder assembly mounted on a truck such that the piston reciprocates in a vertical direction. The piston is adapted to contact a baseplate which is carried by the truck and which is adapted to contact the earth's surface. The piston is typically operatively connected to the baseplate such that vibration of the piston is transmitted through the baseplate to the earth.

The cylinder housing carried by the truck is a heavy mass, called a reaction mass, utilized to help assure good coupling between the baseplate and the earth. The cylinder housing often weighs several thousand pounds. When a seismic observation is to be made, the baseplate is placed in contact with the ground. The truck is then often jacked off the ground so that the truck's mass assists in coupling the baseplate to the earth.

In operation of the vibrator, an electrical signal is utilized to establish a reciprocating motion of the vibrator piston. Typically, this electrical signal will be a sinusoidal signal. In a typical vibrator, a control valve directly responsive to the sinusoidal electrical signal directs hydraulic fluid alternately to one side of the piston, to cause movement in a first direction, and then to the alternate side of the piston to cause movement in the reverse direction. The control valve typically is a spool valve in which a central valve spool moves back and forth within a valve body. The movement of the valve spool between opposite extremes of travel causes the above-described direction of hydraulic fluid to alternating sides of the piston.

As the valve spool travels from one end position to the other end position in response to the drive signal, the valve spool passes through a null point in which the hydraulic fluid is trapped in the piston/cylinder assembly. The trapping of this fluid when the valve spool passes through the null point causes a spike or pulse to occur in the pressure across the piston. This pressure spike produces distortion in the force which the vibrator imparts to the earth. Specifically, the signal will produce a series of unwanted harmonic peaks in the frequency spectrum of such force. This pressure spike is typically largest when the valve spool is reciprocating at relatively low frequencies. If certain harmonics have too great an amplitude, the vibrator baseplate may decouple from the earth. Such decoupling not only adversely affects the energy imparted to the earth, but also increases the mechanical strain on the various parts of the vibrator.

In some hydraulic seismic vibrators, it is desirable to utilize various electronic signals to optimize control of the force generated by the vibrator and imparted to the ground. The signals utilized for such force control may include signals representative of various vibrator response parameters, including the acceleration of the reaction mass (the vibrator cylinder), the acceleration of the baseplate, and the vibrator output force imparted to the ground. The use of these signals to control the force of a vibrator is descibed in co-pending U.S. patent application, Ser. No. 676,718, filed Nov. 30, 1984, entitled "Automatic Force Control for a Seismic Vibrator" and assigned to the assignee of the present invention. The specification of application Ser. No. 676,718 is hereby incorporated herein by reference for all purposes. Briefly, a force control circuit such as that disclosed in the afore-mentioned patent application modifies the electrical drive signal utilized to drive the control valve of the vibrator so as to conform the vibrator output force signal to a pre-established reference signal. When such a force control system is utilized, the presence of harmonic distortion in the vibrator, output force signal or in the other signals representative of vibrator response parameters will adversely affect the performance of the force control circuit.

Accordingly, the present invention provides a new method and apparatus for providing optimal harmonic characteristics of force imparted to the earth by a seismic vibrator and for thereby facilitating the generation of signals representative of such force and of other parameters of vibrater performance which are optimally free of distortion.

SUMMARY OF THE INVENTION

In a hydraulic seismic vibrator controlled by an electrical drive signal, the vibrator response parameters may be significantly improved by modifying the conventional sinusoidal drive signal such that the signal crosses the neutral axis generally instantaneously. In one preferred embodiment of the invention, a square wave signal having the same frequency as the sinusoidal drive signal is summed with the sinusoidal drive signal to provide a composite vibrator drive signal. The square wave signal is weighted to be of lesser amplitude then the sinusoidal drive signal such that the composite vibrator drive signal includes the generally instantaneous traversal of the reference axis from the square wave signal while the remainder of the composite drive signal generally retains the characteristics of the sinusoidal signal.

BRIEF DESCRIPTION OF THE DRAWINGS

FIG. 1 depicts a vibrator response linearization circuit in accordance with the present invention, illustrated in block diagram form, in a typical operating association with a hydraulic vibrator, depicted schematically.

FIG. 2 depicts signals associated with the operation of the vibrator response circuit of FIG. 1.

FIG. 3 depicts the vibrator response linearization circuit of FIG. 1, illustrated in schematic representation.

FIGS. 4A-B graphically depict a signal representative of the differential pressure across the piston of a vibrator. FIG. 4A depicts the signal as the vibrator is driven with a conventional sinusoidal drive signal, and FIG. 4B depicts the signal as the vibrator is driven with a drive signal produced in accordance with the present invention.

FIG. 5A depicts the frequency spectrum when the vibrator is driven with a conventional sinusoidal drive signal, and FIG. 5B depicts the frequency spectrum when the vibrator is driven with a drive signal produced in accordance with the present invention.

FIG. 6A depicts the frequency spectrum when the vibrator is driven with a conventional sinusoidal drive signal, and FIG. 6B depicts the frequency spectrum when the vibrator is driven with a drive signal produced in accordance with the present invention.

FIGS. 7A-B graphically depict the frequency spectrum of a signal representative of the vibrator output force. FIG. 7A depicts the vibrator output force when the vibrator is driven with a conventional sinusoidal drive signal, and FIG. 7B depicts the vibrator output force when the vibrator is driven with a drive signal produced in accordance with the present invention.

DETAILED DESCRIPTION OF A PREFERRED EMBODIMENT

Figure 5A:
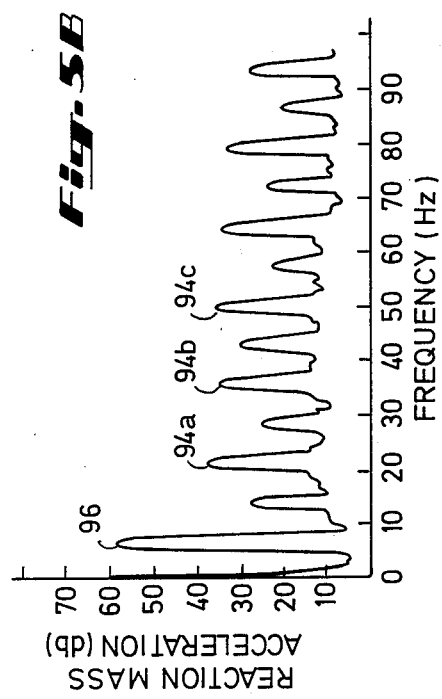
FIGS. 5A-B graphically depict curves representative of the frequency spectrum of the acceleration of the reaction mass of a hydraulic vibrator.

Refering now to the drawings in more detail, and particularly to FIGS. 1 and 2, therein is shown in FIG. 1 a vibrator response linearization circuit 10 in accordance with the present invention, illustrated in block diagram form, in a typical operating association with a hydraulic vibrator, depicted schematically. FIG. 2 depicts signals associated with the operation of vibrator response circuit 10 which will be referred to herein.

Vibrator response linearization circuit 10 includes an absolute value circuit 12, a square wave generator 14, timing and control circuitry 16, and summing circuitry 18. Vibrator response circuit 10 functions to optimalize vibrator response in response to a conventional sinusoidal input drive signal 20. Input drive signal 20 may be generated by a conventional signal generating mechanism (not illustrated). The frequency of input drive signal 20 will typically increase rapidly during a seismic sweep period. The embodiment of vibrator response circuit 10 discussed and depicted herein is responsive to an input signal for which the frequency is varied from 5 Hz to 255 Hz in as short a sweep period as one second.

Input drive signal 20 is communicated to absolute value circuit 12, square wave generator 14, timing and control circuitry 16 and summing circuitry 18. Absolute value circuit 12 generates an absolute value signal 22 which is communicated to square wave generator 14. Absolute value signal 22 has the same frequency as input drive signal 20, but oscillates only to the positive side of the zero voltage axis. Square wave generator 14 generates a square wave signal 24 in phase with input drive signal 20. Square wave signal 24 includes a plurality of square waves relative to a reference axis, each square wave peak directly proportional to the peaks of input drive signal 20. Timing and control circuitry 16 generates a timing signal 23 utilized to control square wave generator 14 to assure that each square wave is generated in response to the same proportionate amount of the peaks of input drive signal 20 regardless of the frequency of input drive signal 20. This control establishes the above-described proportionality between square wave signal 24 and input drive signal 20. Summing circuitry 18 sums input drive signal 20 and square wave signal 24 to generate an output drive signal 26.

Output drive signal 26 of vibrator response linearization circuit 10 is communicated to an actuator 28 which drives control valve 30. Control valve 30 controls the supply of hydraulic fluid to alternate sides of piston 32 as described earlier herein. Control valve 30 contains a valve spool, also as described earlier herein. As the output drive signal 26 changes polarity, it causes the valve spool to move between alternate end positions and to thereby reverse the direction of piston 32 in cylinder 34. As discussed earlier herein, vibrator 29 includes a baseplate 36 in contact with the earth 38. Typically, the weight of truck 40 is applied to baseplate 40 to provide the maximum available mass to keep baseplate 40 coupled to the earth. The reciprocating movement of piston 32 causes baseplate 36 to vibrate against the earth 38, thus imparting the vibratory energy utilized in seismic exploration into the earth.

Referring now also to FIG. 3, therein is shown vibrator response linearization circuit 10 of FIG. 1 depicted in schematic representation. Absolute value circuit 12 includes a pair of operational amplifiers ("hereinafter "op-amps") 40, 41 cooperatively arranged with diodes 42, 43 to generate absolute value signal 22 as depicted in FIG. 2. Op-amps 40, 41, as well as op-amps 54, 55, 68, 72, 78 and 80 to be described later herein, may be composed of quad op-amps such as those manufactured by National Semiconductor, Inc. and identified as model LF347BN.

Square wave generator 14 and timing and control circuitry 16 cooperatively generate square wave signal 24. Input drive signal 20 is input to comparator 44 which outputs a signal of positive-going square pulses 46. Comparator 42 is preferably a component such as the comparator manufactured by National Semiconductor, Inc. and identified as model LM311N. Positive-going pulse signal 46 is in phase with input drive signal 20 and is positive-going during the positive half cycles of input drive signal 20. In the illustrated embodiment, positive-going pulse signal 46 has an amplitude of 5 volts.

Positive-going pulse signal 46 is passed to NAND gates 48, 49 which generate pulses at the leading and trailing edges of each positive-going pulse in pulse signal 46. NAND gates 48, and 49, as well as NAND gates 54, and 58 to be described later herein are preferably C-MOS gates such as those manufactured by RCA and identified as model CD4011B. The pulses from NAND gates 48, 49 are ulitized to clock first monostable multivibrator 52. In response to each clock pulse, first monostable multivibrator 52 will generate a reset pulse to reset second monostable multivibrator 53.

Absolute value signal 22 is also utilized in the generation of timing signal 23. Absolute value signal 22 is input to op-amps 54 and 55. Op-amp 54 functions as an inverter while op-amp 55 functions as a peak detector of the inverted absolute value signal from op-amp 54. The output of op-amp 55 is a trigger pulse which is applied to the clock input of second monostable multivibrator 53. This trigger pulse initiates an output pulse to NAND gate 56. NAND gate 56 is responsive to both the trigger pulse and a sweep enable signal 61. Sweep enable signal 61 is utilized to control the operation of square wave generator 14 to prevent signal generation in response to noise or other unwanted signals. The pulses utilized to reset second monstable mulitvibrator 53 are also applied to NAND gate 58. NAND gate 58 serves to close switch 60 to hold the negative input of op-amp 55 to ground to initilize op-amp 55 for peak detection.

The duration of pulses generated at the output of second monostable multivibrator 53 is limited by the pulse signal output of first monostable multivibrator 52.

Second monostable output 62 and sweep enable signal 61 pass to NAND gate 56 to establish timing signal 23. The duration of timing signal 23 is always proportional to the duration of input drive signal 20, regardless of the frequency of input drive signal 20. Timing signal 23 closes switch 64 to establish a sample signal 66 representing a sample of the peak amplitude of absolute value signal 22. Switches 60 and 64 are preferably logic controlled analog switches such as those manufactured by Intersil and identified as model IH5145CPE. Sample signal 66 is input to op-amp 68 which generates a DC voltage level, the level of which is equal to the peak amplitude of absolute value signal 22, and therefore to input drive signal 20. This DC level is input to op-amp 72. A transistor 74 responsive to pulse signal 46 from comparator 44 serves as a switch to change op-amp 72 from an inverting buffer to a noninverting buffer on alternate half cycles of input drive signal 20. Transistor 74 is preferably of the type Jedec No. 2N4401. The output of op-amp 72 is thus square wave signal 24 which is in phase with input drive signal 20 and has an amplitude equal to the corresponding peak amplitude of input drive signal 20. Square wave signal 24 is then communicated to summing circuitry 18 where square wave signal 24 is summed with input drive signal 20.

Square wave signal 24 should be substantially synchronized with input drive signal 20. However, in a particularly preferred embodiment, a potentiometer 76 is cooperatively coupled to an op-amp 78 which receives square wave signal 24 to facilitate manual phase shifting of square wave signal 24 relative to input drive signal 20. Square wave signal 24 and input drive signal 20 are then summed by op-amp 80. A plurality of resistors 82, 84, 86, 88 are provided to establish the weighting of the amplitude of square wave signal 24 relative to the amplitude of input drive signal 20. In the illustrated preferred embodiment, resistors 82, 84, 86, 88 are selected to establish the maximum amplitude of drive signal 20 at a level approximately 5 times or less the maximum amplitude of square wave signal 24. It should be readily understood, however, that the benefits of the invention may be obtained by lower ratios of the amplitude of the input drive signal to the square wave signal; for example, when the amplitude of the input drive signal is approximately 3 times the amplitude of the square wave signal. The benefits obtained through various ratios of square wave signals to sinusoidal signals will be determined by the structure of operating conditions of the control valve being actuated.

As described earlier herein, a bypass switch 27 may be provided to allow the vibrator to be operated with either the conventional input drive signal 20 or output drive signal 26.

As can best be seen in FIG. 2, the angle at which output drive signal 26 crosses the zero voltage axis is substantially normal. In the signal produced by the circuitry described and illustrated herein, the transition time between one-third of the peak amplitude of output drive signal 26 above the zero voltage axis to one-third of the peak amplitude of output signal 26 below the zero voltage axis is less than 1 microsecond. Those skilled in the art will recognize that greater relative transition times will still prove beneficial in many applications. In a circuit as described and illustrated herein, for an output drive signal having a peak-to-peak amplitude of 1.5 volts, at 11 Hz, output drive signal 26 would preferably have an effective frequency across the zero axis of 1.6 MHz.

Referring now to FIGS. 4A–B, therein is depicted in FIG. 4A a signal representative of the differential pressure across the piston (32 in FIG. 1) of the vibrator (29 in FIG. 1). FIG. 4A graphically depicts the differential pressure while driving the vibrator with a conventional sinusoidal drive signal while FIG. 4B depicts the differential pressure when the vibrator is driven with a drive signal produced in accordance with the present invention. Referring first to FIG. 4A, a substantial pressure spike 118 is present when the vibrator is driven by a conventional sinusoidal drive signal. As discussed earlier herein, this pressure spike occurs as the valve spool controlling the reciprocating movement of the piston passes through a central null point. Referring now to FIG. 4B, when the vibrator is driven with a signal produced in accordance with the present invention, a corresponding area of the differential pressure curve reflects that the spike has for all practical purposes been eliminated.

FIG. 5A–B, 6A–B, and 7A–B each depict a curve representative of a different parameter of vibrator performance. The "A" drawing of each figure depicts the parameter when the vibrator is driven with a sample conventional sinusoidal drive signal, while the "B" drawing of each figure depicts the parameter when the same vibrator is driven with a sample drive signal produced in accordance with the present invention. The sample drive signal in each case had a peak-to-peak amplitude of 1.5 volts and a frequency of 7 Hz.

Figure 5B:
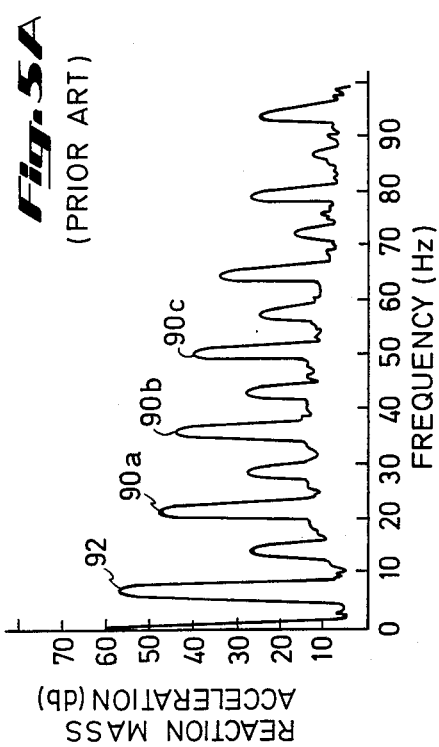

Referring now to FIGS. 5A–B, therein are graphically depicted curves representing the frequency spectrum of the acceleration of the reaction mass of a hydraulic vibrator. As can be seen in FIG. 5A, when the vibrator was driven with a conventional signal, the third, fifth and seventh harmonic peaks 90a, 90b and 90c, respectively, are relatively large in amplitude relative to the amplitude of the fundamental peak 92. As can be seen in FIG. 5B, when the vibrator was driven by a signal in accordance with the present invention, the amplitudes of the third, fifth and seventh harmonic peaks 94a, 94b and 94c, respectively, are substantially reduced relative to the amplitude of fundamental peak 96.

Figure 6A:
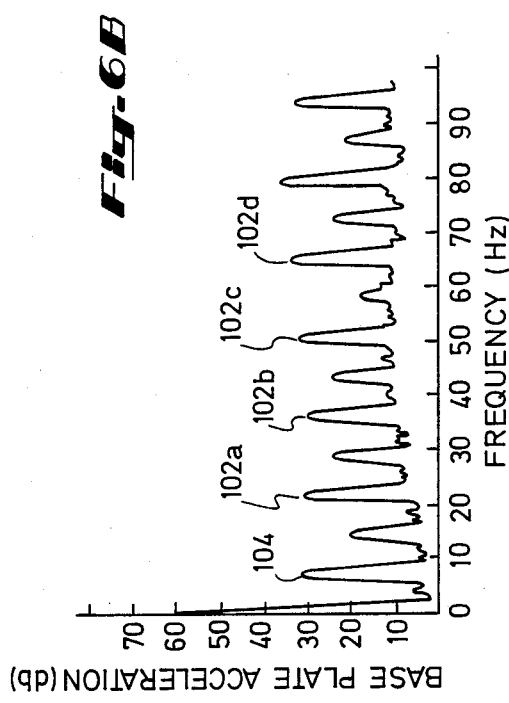
FIGS. 6A-B graphically depict the frequency spectrum of signals representative of the baseplate acceleration of a hydraulic vibrator.
Figure 6B:
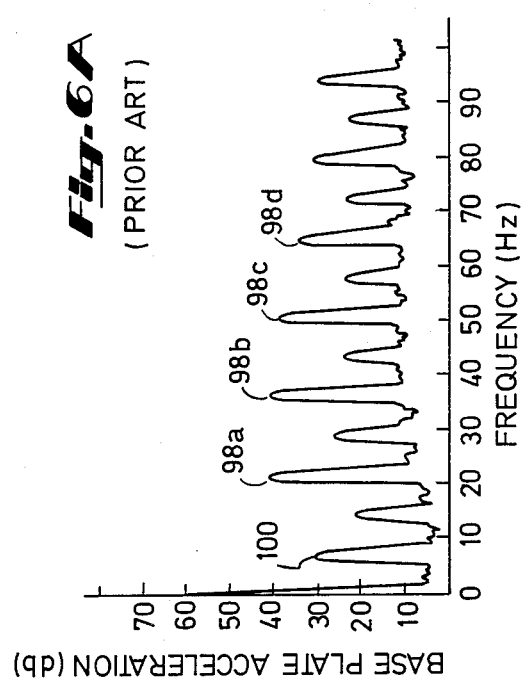

FIGS. 6A–B graphically depict the frequency spectrum of signals representative of the baseplate acceleration of a hydraulic vibrator. Referring to FIG. 5A, the third, fifth, seventh and ninth harmonics 98a, 98b, 98c and 98d, respectively, are each larger in amplitude than the amplitude of the signal fundamental 100. In FIG. 5B, where the vibrator was driven with the signal produced in accordance with the present invention, the excessive amplitude of the third, fifth, seventh and ninth harmonics, 102a, 102b, 102c and 102d, respectively, have been substantially reduced relative to the amplitude of the signal fundamental 104.

FIGS. 7A–B graphically depict the frequency spectrum of a signal representative of the vibrator output force imparted to the ground. Referring first to FIG. 6A, the third, fifth, and seventh harmonics 108a, 108b and 108c, respectively, are relatively large in amplitude relative to the amplitude of the fundamental 110. In FIG. 7B, when the vibrator was driven by a drive signal in accordance with the present invention, the third, fifth and seventh harmonics 112a, 112b and 112c, respectively, are substantially reduced in amplitude relative to the amplitude of fundamental 114.

As can be seen from FIGS. 5A–B, 6A–B and 7A–B, the operation of a vibrator with a drive signal produced in accordance with the methods and apparatus described herein substantially reduces the undesirable harmonics in vibrator response parameters. This reduction of harmonics facilitates optimal control of the vibrator in seismic operations.

Many modifications and variations may be made in the embodiments described herein and depicted in the accompanying drawings without departing from the concept of the present invention. Accordingly, it is to be clearly understood that the embodiments described and illustrated herein are illustrative only and are not intended as limitations on the scope of the present invention.

What is claimed is:

1. A method of generating a drive signal for driving a seismic vibrator, comprising the steps of:
    generating a generally sinusoidal signal;
    generating a generally square wave signal, said square wave signal substantially in phase with said sinusoidal signal, said square wave signal having a amplitude less than the amplitude of said sinusoidal signal; and
    combining said sinusoidal and square wave signals to form a vibrator drive signal.

2. The method of claim 1, wherein the amplitude of said square wave signal is less than one-third the amplitude of said sinusoidal signal.

3. The method of claim 2, wherein the amplitude of said square wave signal is approximately one-fifth the amplitude of said sinusoidal signal.

4. A method of seismic exploration in which a vibrator is driven in response to a generally sinusoidal signal, comprising the step of modifying said generally sinusoidal signal such that the signal passes from one side of the neutral axis to the other side of the neutral axis generally instantaneously so as to minimize undesirable harmonics in the vibrator output force.

5. The method claim 4, wherein said sinusoidal signal is modified by combining said sinusoidal signal with a substantially square wave signal.

6. The method of claim 5, wherein the amplitude of said substantially square wave signal is less than one-third the amplitude of said substantially sinusoidal signal.

7. The method of claim 4, wherein said transition time from one side of the neutral axis to the other side of the neutral axis is less than approximately 1 microsecond.

8. An apparatus for generating a drive signal to operate a hydraulic seismic vibrator responsive to a generally sinusoidal electrical signal, comprising:
    means for generating a generally square wave signal; and
    means for combining said sinusoidal signal and said square wave signal to form a drive signal for said vibrator.

9. The apparatus of claim 8, wherein the amplitude of said generally square wave signal is smaller than the amplitude of said generally sinusoidal signal.

10. An apparatus for modifying a generally sinusoidal electrical signal for use in driving a hydraulic vibrator, comprising circuitry for modifying said generally sinusoidal signal such that said signal will pass from a region on one side of the reference axis of said sinusoidal signal to a region on the opposite side of said reference axis generally instantaneously, said region of sufficient amplitude range that said generally instantaneous passing will reduce undesirable harmonics in the vibrator output force.

11. The apparatus of claim 10, wherein said modifying circuitry comprises:
    signal generation circuitry for generating a square wave signal generally in phase with said sinusoidal signal; and
    summing circuitry for summing summing said square wave signal and said sinusoidal signal.

12. The apparatus of claim 11, wherein said modifying circuitry further comprises circuitry for varying the relative amplitude of said square wave signal to said sinusoidal signal prior to the summing of said signals.

* * * * *